US012613642B2

(12) United States Patent

Guim Bernat et al.

(10) Patent No.: US 12,613,642 B2

(45) Date of Patent: Apr. 28, 2026

(54) ADAPTIVE RAS PLATFORM BASED ON CORRELATIVE PREDICTION

(71) Applicant: Intel Corporation, Santa Clara, CA (US)

(72) Inventors: Francesc Guim Bernat, Barcelona (ES); Karthik Kumar, Chandler, AZ (US); Thomas Willhalm, Sandausen (DE); Hsing-Min Chen, Santa Clara, CA (US); Theodros Yigzaw, Sherwood, OR (US); Russell Clapp, Portland, OR (US); Saravanan Sethuraman, Bayan Lepas (MY); Patricia Mwove Shaffer, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 710 days.

(21) Appl. No.: 17/856,637

(22) Filed: Jul. 1, 2022

(65) Prior Publication Data

US 2022/0334736 A1 Oct. 20, 2022

(51) Int. Cl.
*G06F 3/06* (2006.01)

(52) U.S. Cl.
CPC .......... *G06F 3/0622* (2013.01); *G06F 3/0637* (2013.01); *G06F 3/0673* (2013.01)

(58) Field of Classification Search
CPC ..... G06F 3/0622; G06F 3/0637; G06F 3/0673
USPC ........................................ 711/154
See application file for complete search history.

(56) References Cited

U.S. PATENT DOCUMENTS

| | | | | |
|---|---|---|---|---|
| 6,480,941 B1 * | 11/2002 | Franke | ................ | G06F 12/0284 |
| | | | | 711/E12.013 |
| 7,233,538 B1 * | 6/2007 | Wu | .................... | G11C 11/40611 |
| | | | | 365/230.03 |
| 7,774,684 B2 * | 8/2010 | Bains | .................. | G06F 11/1008 |
| | | | | 714/766 |
| 9,208,018 B1 * | 12/2015 | Northcott | ............ | G06F 11/1008 |
| 9,825,827 B2 * | 11/2017 | Andrade Costa | ... | H04L 43/0817 |
| 9,983,828 B2 * | 5/2018 | Shen | ...................... | G11C 29/42 |
| 10,733,110 B1 * | 8/2020 | Volpe | .................... | G06F 3/0656 |
| 2003/0088799 A1 * | 5/2003 | Bodas | ..................... | G06F 1/206 |
| | | | | 713/320 |

(Continued)

OTHER PUBLICATIONS

A. Yao et al., "A Memory RAS System Design and Engineering Practice in High Temperature Ambient Data Center," 2020 19th IEEE Intersociety Conference on Thermal and Thermomechanical Phenomena in Electronic Systems (ITherm), Orlando, FL, USA, 2020, pp. 1379-1388, doi: 10.1109/ITherm45881.2020.9190253. (Year: 2020).*

*Primary Examiner* — Reginald G Bragdon
*Assistant Examiner* — Aaron D Ho
(74) *Attorney, Agent, or Firm* — Essential Patents Group, LLP

(57) ABSTRACT

An embodiment of an electronic apparatus may comprise one or more substrates and a controller coupled to the one or more substrates, the controller including circuitry to apply a reliability, availability, and serviceability (RAS) policy for access to a memory in accordance with a first RAS scheme, change the applied RAS policy in accordance with a second RAS scheme at runtime, where the second RAS scheme is different from the first RAS scheme, and access the memory in accordance with the applied RAS policy. Other embodiments are disclosed and claimed.

22 Claims, 10 Drawing Sheets

(56) References Cited

U.S. PATENT DOCUMENTS

| | | | | |
|---|---|---|---|---|
| 2006/0184480 A1* | 8/2006 | Ayyar | G06F 9/44505 | |
| | | | | 706/45 |
| 2008/0168313 A1* | 7/2008 | Blocksome | G06F 11/076 | |
| | | | | 714/57 |
| 2009/0132888 A1* | 5/2009 | Bains | G06F 11/1004 | |
| | | | | 714/E11.007 |
| 2011/0161592 A1* | 6/2011 | Nachimuthu | G06F 15/7871 | |
| | | | | 711/135 |
| 2013/0346825 A1* | 12/2013 | Marukame | H03M 13/1102 | |
| | | | | 714/758 |
| 2016/0202926 A1* | 7/2016 | Benedict | G06F 12/123 | |
| | | | | 711/106 |
| 2017/0153939 A1* | 6/2017 | Govindan | G06F 3/064 | |
| 2019/0042369 A1* | 2/2019 | Deutsch | G06F 3/0673 | |
| 2020/0004627 A1* | 1/2020 | Sharon | G06F 3/064 | |
| 2020/0035321 A1* | 1/2020 | Berke | G11C 29/08 | |
| 2021/0096751 A1* | 4/2021 | Berman | G06N 3/0499 | |
| 2021/0216216 A1* | 7/2021 | Brandt | G06F 3/0653 | |
| 2021/0325954 A1* | 10/2021 | Guim Bernat | G06F 1/3228 | |
| 2022/0050603 A1* | 2/2022 | Zhou | G06F 3/0619 | |

* cited by examiner

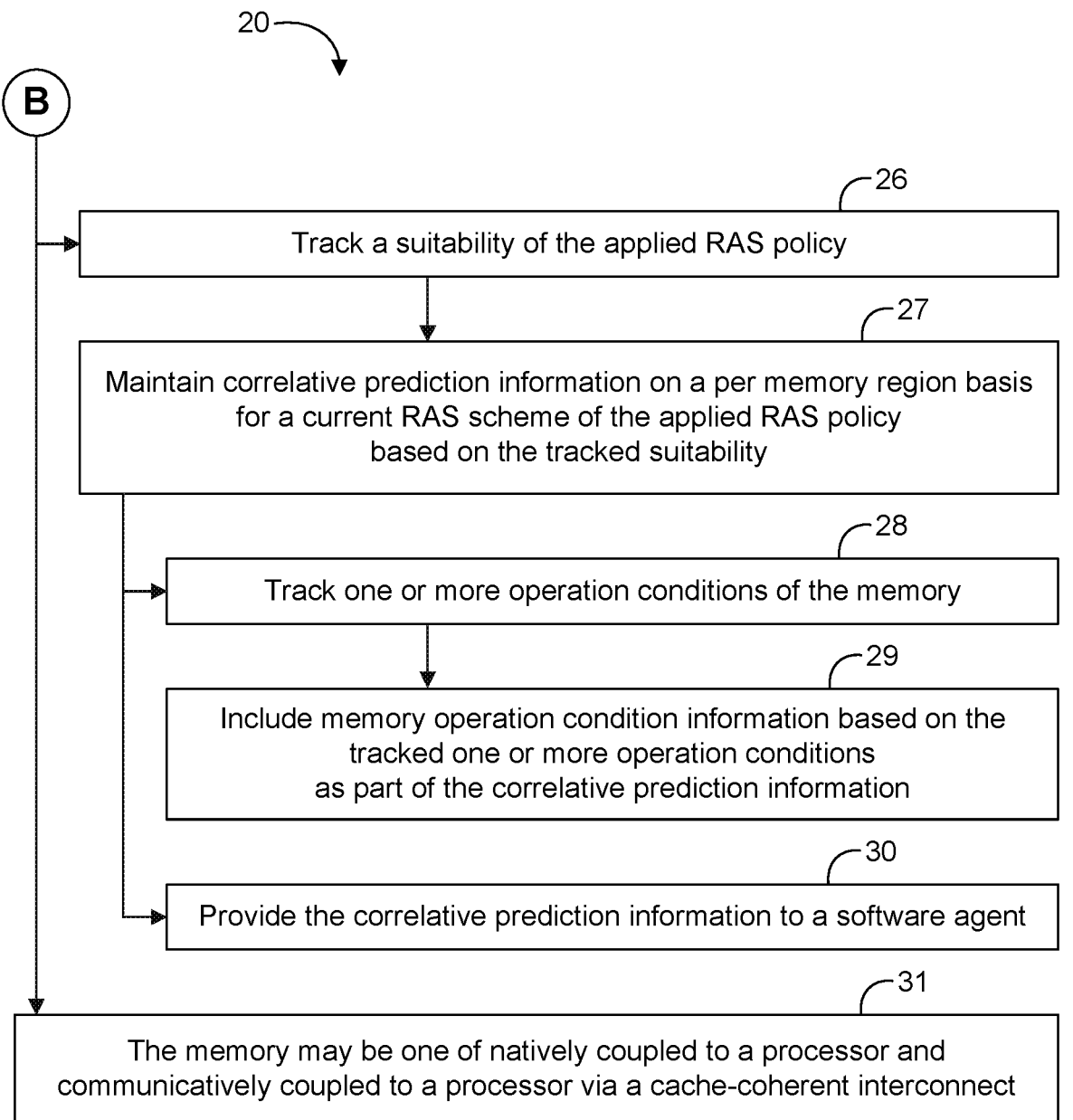

20

B

26
Track a suitability of the applied RAS policy

27
Maintain correlative prediction information on a per memory region basis
for a current RAS scheme of the applied RAS policy
based on the tracked suitability 28
Track one or more operation conditions of the memory 29
Include memory operation condition information based on the
tracked one or more operation conditions
as part of the correlative prediction information 30
Provide the correlative prediction information to a software agent 31
The memory may be one of natively coupled to a processor and
communicatively coupled to a processor via a cache-coherent interconnect

FIG. 3B

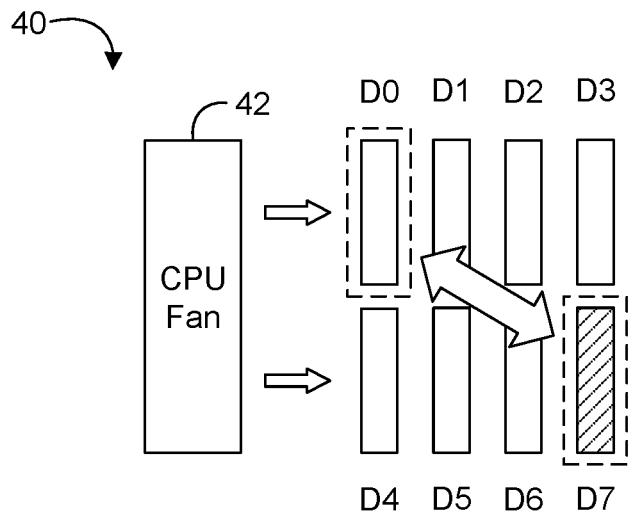
FIG. 4C
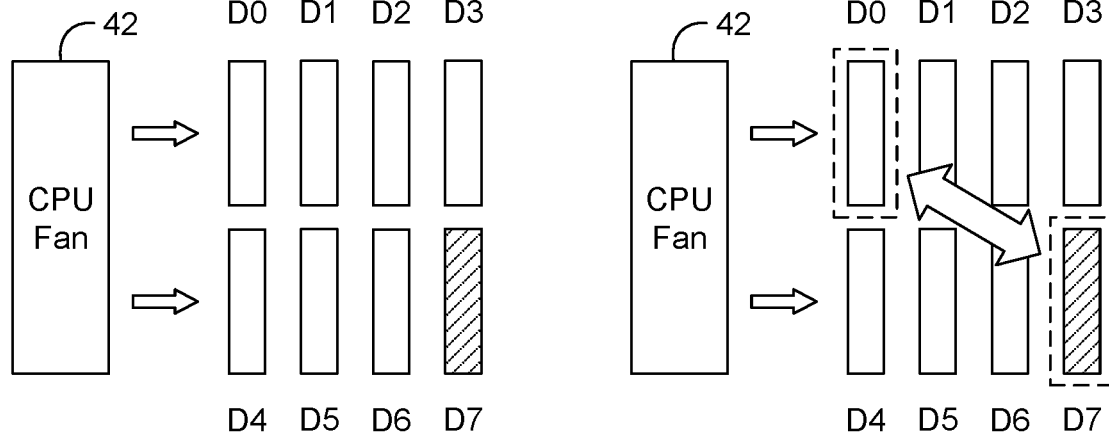
FIG. 4D                    FIG. 4E

| hex | dec | | Rank A | | | | | | | | Rank B | | | | | | |
| --- | --- | 0 | 1 | 2 | 3 | 4 | 5 | 6 | 7 | 8 | 9 | 10 | 11 | 12 | 13 | 14 | 15 |
| 0 | 0 | D0 | D1 | D2 | D3 | D0 | D1 | D2 | D3 | D0 | D4 | D8 | D12 | D0 | D1 | D2 | D3 |
| | | D4 | D5 | D6 | D7 | D4 | D5 | D6 | D7 | D1 | D5 | D9 | D13 | D4 | D5 | D6 | D7 |
| | | D8 | D9 | D10 | D11 | D8 | D9 | D10 | D11 | D2 | D6 | D10 | D14 | D8 | D9 | D10 | D11 |
| | | D12 | D13 | D14 | D15 | D12 | D13 | D14 | D15 | D3 | D7 | D11 | D15 | D12 | D13 | D14 | D15 |
| 1 | 1 | D0 | D1 | D2 | D3 | D0 | D1 | D2 | D3 | D0 | D4 | D8 | D12 | D0 | D1 | D2 | D3 |
| | | D4 | D5 | D6 | D7 | D4 | D5 | D6 | D7 | D1 | D5 | D9 | D13 | D4 | D5 | D6 | D7 |
| | | D8 | D9 | D10 | D11 | D8 | D9 | D10 | D11 | D2 | D6 | D10 | D14 | D8 | D9 | D10 | D11 |
| | | D12 | D13 | D14 | D15 | D12 | D13 | D14 | D15 | D3 | D7 | D11 | D15 | D12 | D13 | D14 | D15 |
| 2 | 2 | D0 | D1 | D2 | D3 | D0 | D1 | D2 | D3 | D0 | D4 | D8 | D12 | D0 | D1 | D2 | D3 |
| | | D4 | D5 | D6 | D7 | D4 | D5 | D6 | D7 | D1 | D5 | D9 | D13 | D4 | D5 | D6 | D7 |
| | | D8 | D9 | D10 | D11 | D8 | D9 | D10 | D11 | D2 | D6 | D10 | D14 | D8 | D9 | D10 | D11 |
| | | D12 | D13 | D14 | D15 | D12 | D13 | D14 | D15 | D3 | D7 | D11 | D15 | D12 | D13 | D14 | D15 |
| 3 | 3 | D0 | D1 | D2 | D3 | D0 | D1 | D2 | D3 | D0 | D4 | D8 | D12 | D0 | D1 | D2 | D3 |
| | | D4 | D5 | D6 | D7 | D4 | D5 | D6 | D7 | D1 | D5 | D9 | D13 | D4 | D5 | D6 | D7 |
| | | D8 | D9 | D10 | D11 | D8 | D9 | D10 | D11 | D2 | D6 | D10 | D14 | D8 | D9 | D10 | D11 |
| | | D12 | D13 | D14 | D15 | D12 | D13 | D14 | D15 | D3 | D7 | D11 | D15 | D12 | D13 | D14 | D15 |
| 4 | 4 | D0 | D1 | D2 | D3 | D0 | D1 | D2 | D3 | D0 | D4 | D8 | D12 | D0 | D1 | D2 | D3 |
| | | D4 | D5 | D6 | D7 | D4 | D5 | D6 | D7 | D1 | D5 | D9 | D13 | D4 | D5 | D6 | D7 |
| | | D8 | D9 | D10 | D11 | D8 | D9 | D10 | D11 | D2 | D6 | D10 | D14 | D8 | D9 | D10 | D11 |
| | | D12 | D13 | D14 | D15 | D12 | D13 | D14 | D15 | D3 | D7 | D11 | D15 | D12 | D13 | D14 | D15 |
| 5 | 5 | D0 | D1 | D2 | D3 | D0 | D1 | D2 | D3 | D0 | D4 | D8 | D12 | D0 | D1 | D2 | D3 |
| | | D4 | D5 | D6 | D7 | D4 | D5 | D6 | D7 | D1 | D5 | D9 | D13 | D4 | D5 | D6 | D7 |
| | | D8 | D9 | D10 | D11 | D8 | D9 | D10 | D11 | D2 | D6 | D10 | D14 | D8 | D9 | D10 | D11 |
| | | D12 | D13 | D14 | D15 | D12 | D13 | D14 | D15 | D3 | D7 | D11 | D15 | D12 | D13 | D14 | D15 |
| 6 | 6 | D0 | D1 | D2 | D3 | D0 | D1 | D2 | D3 | D0 | D4 | D8 | D12 | D0 | D1 | D2 | D3 |
| | | D4 | D5 | D6 | D7 | D4 | D5 | D6 | D7 | D1 | D5 | D9 | D13 | D4 | D5 | D6 | D7 |
| | | D8 | D9 | D10 | D11 | D8 | D9 | D10 | D11 | D2 | D6 | D10 | D14 | D8 | D9 | D10 | D11 |
| | | D12 | D13 | D14 | D15 | D12 | D13 | D14 | D15 | D3 | D7 | D11 | D15 | D12 | D13 | D14 | D15 |
| 7 | 7 | D0 | D1 | D2 | D3 | D0 | D1 | D2 | D3 | D0 | D4 | D8 | D12 | D0 | D1 | D2 | D3 |
| | | D4 | D5 | D6 | D7 | D4 | D5 | D6 | D7 | D1 | D5 | D9 | D13 | D4 | D5 | D6 | D7 |
| | | D8 | D9 | D10 | D11 | D8 | D9 | D10 | D11 | D2 | D6 | D10 | D14 | D8 | D9 | D10 | D11 |
| | | D12 | D13 | D14 | D15 | D12 | D13 | D14 | D15 | D3 | D7 | D11 | D15 | D12 | D13 | D14 | D15 |
| 8 | 8 | P0 | P1 | P2 | P3 | P0 | P1 | P2 | P3 | P32 | P33 | P34 | P35 | P32 | P33 | P34 | P35 |
| | | P4 | P5 | P6 | P7 | P4 | P5 | P6 | P7 | P36 | P37 | P38 | P39 | P36 | P37 | P38 | P39 |
| | | P8 | P9 | P10 | P11 | P8 | P9 | P10 | P11 | P40 | P41 | P42 | P43 | P40 | P41 | P42 | P43 |
| | | P12 | P13 | P14 | P15 | P12 | P13 | P14 | P15 | P44 | P45 | P46 | P47 | P44 | P45 | P46 | P47 |
| 9 | 9 | P16 | P17 | P18 | P19 | P16 | P17 | P18 | P19 | P48 | P49 | P50 | P51 | P48 | P49 | P50 | P51 |
| | | P20 | P21 | P22 | P23 | P20 | P21 | P22 | P23 | P52 | P53 | P54 | P55 | P52 | P53 | P54 | P55 |
| | | P24 | P25 | P26 | P27 | P24 | P25 | P26 | P27 | P56 | P57 | P58 | P59 | P56 | P57 | P58 | P59 |
| | | P28 | P29 | P30 | P31 | P28 | P29 | P30 | P31 | P60 | P61 | P62 | P63 | P60 | P61 | P62 | P63 |

FIG. 5

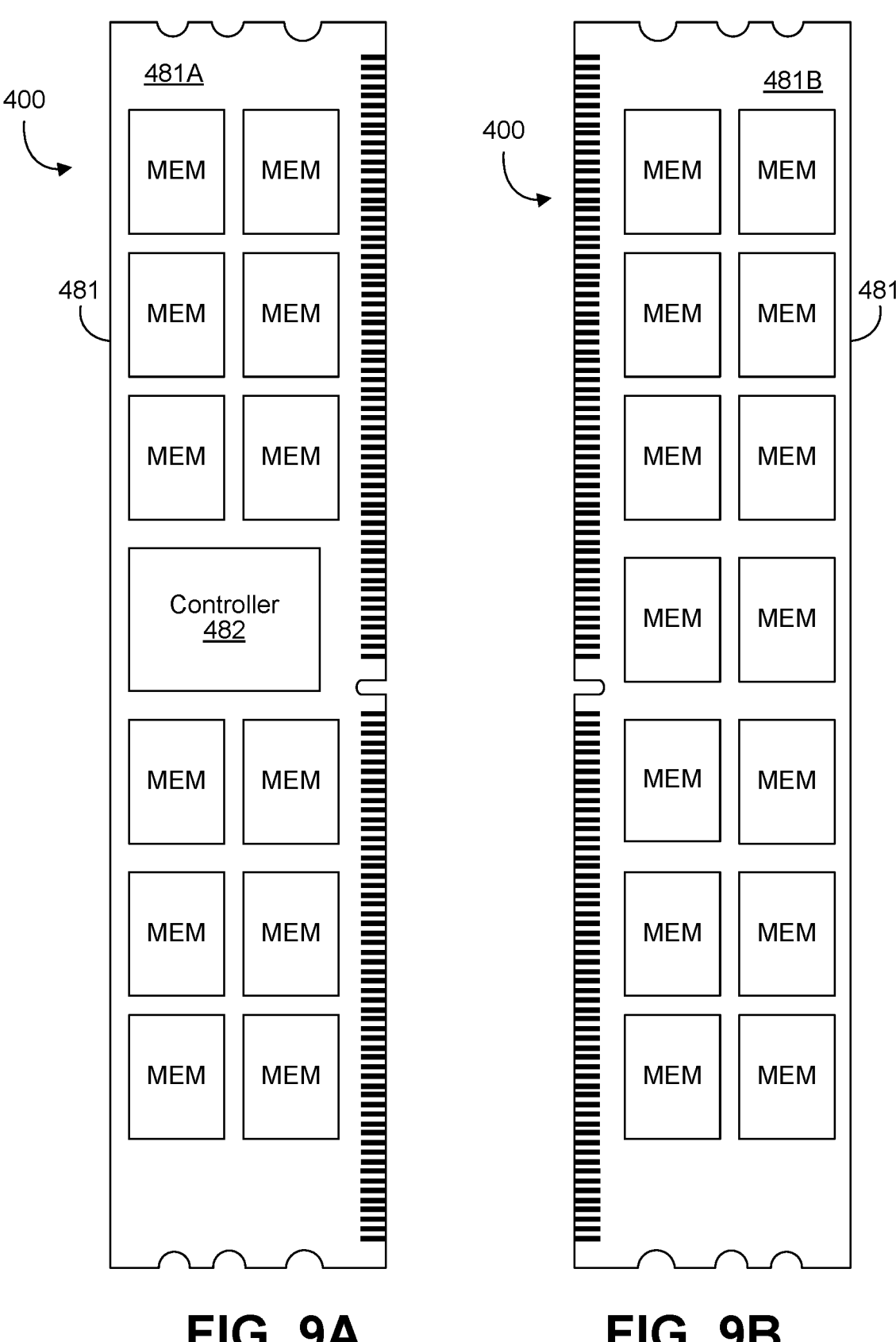
FIG. 9A          FIG. 9B

ADAPTIVE RAS PLATFORM BASED ON CORRELATIVE PREDICTION

BACKGROUND

Reliability, availability and serviceability (RAS), sometimes also referred to as reliability, availability, and maintainability (RAM), refers to computer hardware and software design features that promote robust and fault-tolerant operation for a long uptime for a computer system. With respect to memory, RAS design features may promote data integrity. Example memory RAS features include error correcting codes (ECC), memory sparing, memory mirroring, single device data correction (SDCC), SDDC plus one (SDDC+1), double device data correction (DDDC), adaptive DDDC (ADDDC), and ADDDC plus one (ADDDC+1).

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIGS. 3A to 3B are illustrative diagrams of an example of a method according to an embodiment;

FIGS. 4A to 4E are illustrative diagrams of an example of a computing system according to an embodiment;

FIG. 5 is an illustrative diagram of example of data and error correction code layout according to an embodiment;

FIGS. 9A and 9B are illustrative top and bottom views of another example of a memory device according to an embodiment.

DETAILED DESCRIPTION

Figure 1:
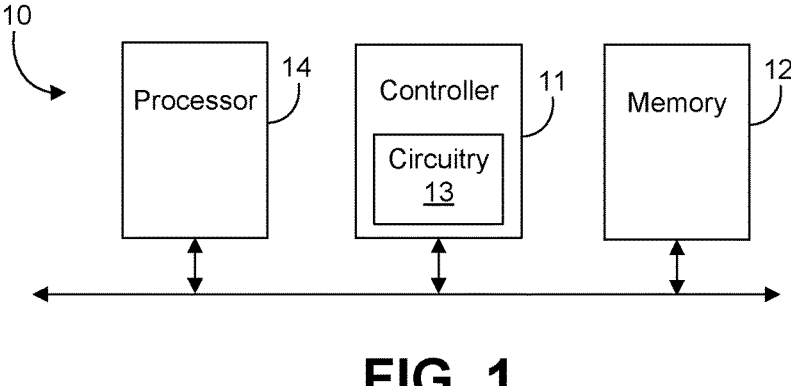
FIG. 1 is a block diagram of an example of an electronic system according to an embodiment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, Field Programmable Gate Array (FPGA), firmware, driver, software, or any combination thereof. The material disclosed herein may also be implemented as instructions stored on a machine-readable medium, which may be read and executed by Moore Machine, Mealy Machine, and/or one or more processors. A machine-readable medium may include any medium and/or mechanism for storing or transmitting information in a form readable by a machine (e.g., a computing device). For example, a machine-readable medium may include read only memory (ROM); random access memory (RAM); Dynamic random-access memory (DRAM), magnetic disk storage media; optical storage media; NV memory devices; phase-change memory, qubit solid-state quantum memory, electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Various embodiments described herein may include a memory component and/or an interface to a memory component. Such memory components may include volatile and/or nonvolatile (NV) memory. Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at jedec.org). Such standards (and similar standards) may be referred to as DDR-based standards and communication interfaces of the storage devices that implement such standards may be referred to as DDR-based interfaces.

NV memory (NVM) may be a storage medium that does not require power to maintain the state of data stored by the medium. In one embodiment, the memory device may include a three dimensional (3D) crosspoint memory device, or other byte addressable write-in-place nonvolatile memory devices. In one embodiment, the memory device may be or may include memory devices that use chalcogenide glass, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In particular embodiments, a memory component with nonvolatile memory may comply with one or more standards promulgated by the JEDEC, or other suitable standard (the JEDEC standards cited herein are available at jedec.org).

A conventional system may employ static selection of reliability, availability, and serviceability (RAS) policies at boot time. For example, single data device correction (SDDC) scheme in a conventional computer system can correct errors from a single failed device. However, many other factors might introduce memory errors. For example, a high temperature or a DRAM internal address error may also cause memory errors. Dual-inline memory modules (DIMMs) with a defective memory device might not show up in the beginning of the operation. The defect may show up later when the system runs a while (e.g., a few months, a year, etc.). Accordingly, an early examination cannot remove the problematic DIMMs. If a DIMM with a defective memory device and high temperature combined together can result in a double device error and double device error correction is beyond the coverage of a SDDC scheme, either a detectable uncorrectable error (DUE) or silent data error (SDE, sometimes also referred to as silent data corruption) may jeopardize the operation of the convention system.

A RAS policy selected at boot time may be suboptimal when employed across spatial and temporal variations, particularly for workloads with different performance sensitivities. An adaptive double device error correction (ADDDC) scheme may be triggered when the first failed device is marked and goes to ADDDC to spare the first failed device and correct second device failure. A problem with ADDDC is that if high temperature causes many single bit errors, many random errors across might be encountered from many devices, and if the wrong device number is marked, double device errors may still hit in ADDDC (e.g., due to temperature and memory defect). If SDDC hits a double device error, the double device error might result in a SDE.

For memory mirroring, the fundamental operation is that the read is from a primary region and the write goes to the primary region and a secondary region. A problem is that if the primary region is hitting high temperature and a memory defective error, the primary region might hit SDE before the recovery from the secondary region. Memory mirroring can only recover from the failure of primary region when an error correction code (ECC) in the primary region reports a DUE. For double device errors, memory mirroring may have SDE because the primary region might mis-detect or mis-correct a double device error and the secondary region will not be accessed to correct the error.

Post package repair (PPR) may be used to spare a failed row in either boot time or runtime if spare rows are still available. If the defective memory failure is a device failure, the resource of spare rows will run out immediately and the device still has the possibility to hit a double device error. For a double device error at runtime, SDDC may hit a SDE and soft PPR (sPPR) will not be triggered.

Data migrating may move the data from a high temperature zone to a low temperature zone. A problem is that data migrating involves loss of capacity and if the low temperature zone is all loaded, there is no place to go. With aggressive refreshing, there is no guarantee to reduce a double device error to a single device error and a SDE may still be possible.

Some embodiments may overcome one or more of the foregoing problems. In some implementations, a platform may employ adaptive RAS platform technology. For example, a platform may employ one or more platform memory RAS schemes at boot time and may adjust the one or more platform memory RAS schemes at runtime. Some embodiments provide adaptive RAS platform technology based on correlative prediction.

With reference to FIG. 1, an embodiment of an electronic system 10 may include memory 12 (e.g., local memory, remote memory, pooled memory, remote pooled memory, tier memory, two level memory (2LM), etc.) and a controller 11 communicatively coupled to the memory 12. The controller 11 may include circuitry 13 to apply a RAS policy for access to the memory 12 in accordance with a first RAS scheme (e.g., at boot time), change the applied RAS policy in accordance with a second RAS scheme at runtime (where the second RAS scheme is different from the first RAS scheme), and access the memory 12 in accordance with the applied RAS policy. In some embodiments, the circuitry 13 may be configured to change the applied RAS policy in accordance with the second RAS scheme at runtime in response to a request from a software agent (e.g., an operating system (OS), a hypervisor, etc.). In some examples, the newly applied RAS policy may involve a combination of different coexisting RAS schemes (e.g., or different RAS policies applied to different memory regions). In some examples, two or more RAS policies may be merged or combined to create the newly applied RAS policy. Those skilled in the art will appreciate that the applied RAS policy may be changed at runtime on numerous occasions over time in response to further requests from the software agent (e.g., due to changed performance needs, changed operating conditions, etc.).

In some embodiments, the circuitry 13 may be further configured to track a suitability of the applied RAS policy, and maintain correlative prediction information on a per memory region basis for a current RAS scheme of the applied RAS policy based on the tracked suitability. In some examples, different RAS policies may be applied to different memory regions. In some examples, information about system performance may feed into the criteria for determining suitability. The circuitry 13 may also be configured to track one or more operation conditions of the memory 12, and include memory operation condition information based on the tracked one or more operation conditions as part of the correlative prediction information. For example, the circuitry 13 may be further configured to provide the correlative prediction information to a software agent (e.g., an OS, a hypervisor, etc.). Some embodiments of the system 10 may further include a processor 14 communicatively coupled to the memory 12. For example, the processor 14 may be natively coupled to the memory 12, communicatively coupled to the memory 12 via a cache-coherent interconnect (e.g., such as Compute Express Link (CXL)), etc.

Embodiments of the controller 11 may include a general purpose controller, a special purpose controller, a memory controller, a storage controller, a micro-controller, an execution unit, etc. In some embodiments, the memory 12, the circuitry 13, and/or other system memory may be located in, or co-located with, various components, including the controller 11 (e.g., on a same die or package substrate). For example, the controller 11 may be configured as a memory controller and the memory 12 may be a connected memory device such as DRAM, NVM, a solid-state drive (SSD), a storage node, etc. Embodiments of each of the above controller 11, memory 12, circuitry 13, and other system components may be implemented in hardware, software, or any suitable combination thereof. For example, hardware implementations may include configurable logic, fixed-functionality logic, or any combination thereof. Examples of configurable logic include suitably configured programmable logic arrays (PLAs), FPGAs, complex programmable logic devices (CPLDs), and general purpose microprocessors. Examples of fixed-functionality logic include suitably configured application specific integrated circuits (ASICs), combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

Alternatively, or additionally, all or portions of these components may be implemented in one or more modules as a set of logic instructions stored in a machine- or computer-readable storage medium such as RAM, ROM, programmable ROM (PROM), firmware, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages. For example, the memory 12, persistent storage media, or other system memory may store a set of instructions (e.g., which may be firmware instructions) which when executed by the controller 11 (e.g., or the processor 14) cause the system 10 to implement one or more components, features, or aspects of the system 10 (e.g., applying the RAS policy for access to the memory in accordance with the first RAS scheme, changing the applied RAS policy in accordance with the second RAS scheme at runtime, accessing the memory in accordance with the applied RAS policy, etc.).

Figure 2:
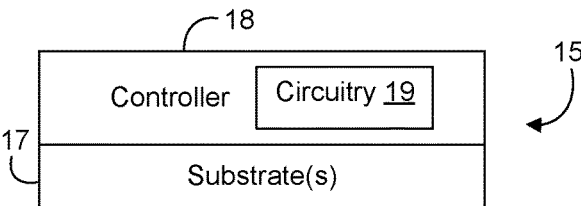
FIG. 2 is a block diagram of an example of an electronic apparatus according to an embodiment.

With reference to FIG. 2, an embodiment of an electronic apparatus 15 may include one or more substrates 17, and a controller 18 coupled to the one or more substrates 17. The controller 18 may include circuitry 19 to apply a RAS policy for access to a memory in accordance with a first RAS scheme (e.g., at boot time), change the applied RAS policy in accordance with a second RAS scheme at runtime (where the second RAS scheme is different from the first RAS scheme), and access the memory in accordance with the applied RAS policy. In some embodiments, the circuitry 19 may be configured to change the applied RAS policy in accordance with the second RAS scheme at runtime in response to a request from a software agent (e.g., an OS, a hypervisor, etc.).

In some embodiments, the circuitry 19 may be further configured to track a suitability of the applied RAS policy, and maintain correlative prediction information on a per memory region basis for a current RAS scheme of the applied RAS policy based on the tracked suitability. The circuitry 19 may also be configured to track one or more operation conditions of the memory, and include memory operation condition information based on the tracked one or more operation conditions as part of the correlative prediction information. For example, the circuitry 19 may be further configured to provide the correlative prediction information to a software agent (e.g., an OS, a hypervisor, etc.). For example, the memory may be natively coupled to a processor, communicatively coupled to a processor via a cache-coherent interconnect, etc.

For example, the controller 18 may be configured as a memory controller. For example, the memory may be a connected memory device (e.g., DRAM, NVM, SSD, a storage node, etc.). Embodiments of the circuitry 19 may be implemented in a system, apparatus, computer, device, etc., for example, such as those described herein. More particularly, hardware implementations may include configurable logic (e.g., suitably configured PLAs, FPGAs, CPLDs, general purpose microprocessors, etc.), fixed-functionality logic (e.g., suitably configured ASICs, combinational logic circuits, sequential logic circuits, etc.), or any combination thereof. Alternatively, or additionally, the circuitry 19 may be implemented in one or more modules as a set of logic instructions stored in a machine- or computer-readable storage medium such as RAM, ROM, PROM, firmware, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages.

For example, the circuitry 19 may be implemented on a semiconductor apparatus, which may include the one or more substrates 17, with the circuitry 19 coupled to the one or more substrates 17. In some embodiments, the circuitry 19 may be at least partly implemented in one or more of configurable logic and fixed-functionality hardware logic on semiconductor substrate(s) (e.g., silicon, sapphire, gallium-arsenide, etc.). For example, the circuitry 19 may include a transistor array and/or other integrated circuit components coupled to the substrate(s) 17 with transistor channel regions that are positioned within the substrate(s) 17. The interface between the circuitry 19 and the substrate(s) 17 may not be an abrupt junction. The circuitry 19 may also be considered to include an epitaxial layer that is grown on an initial wafer of the substrate(s) 17.

Figure 3A:
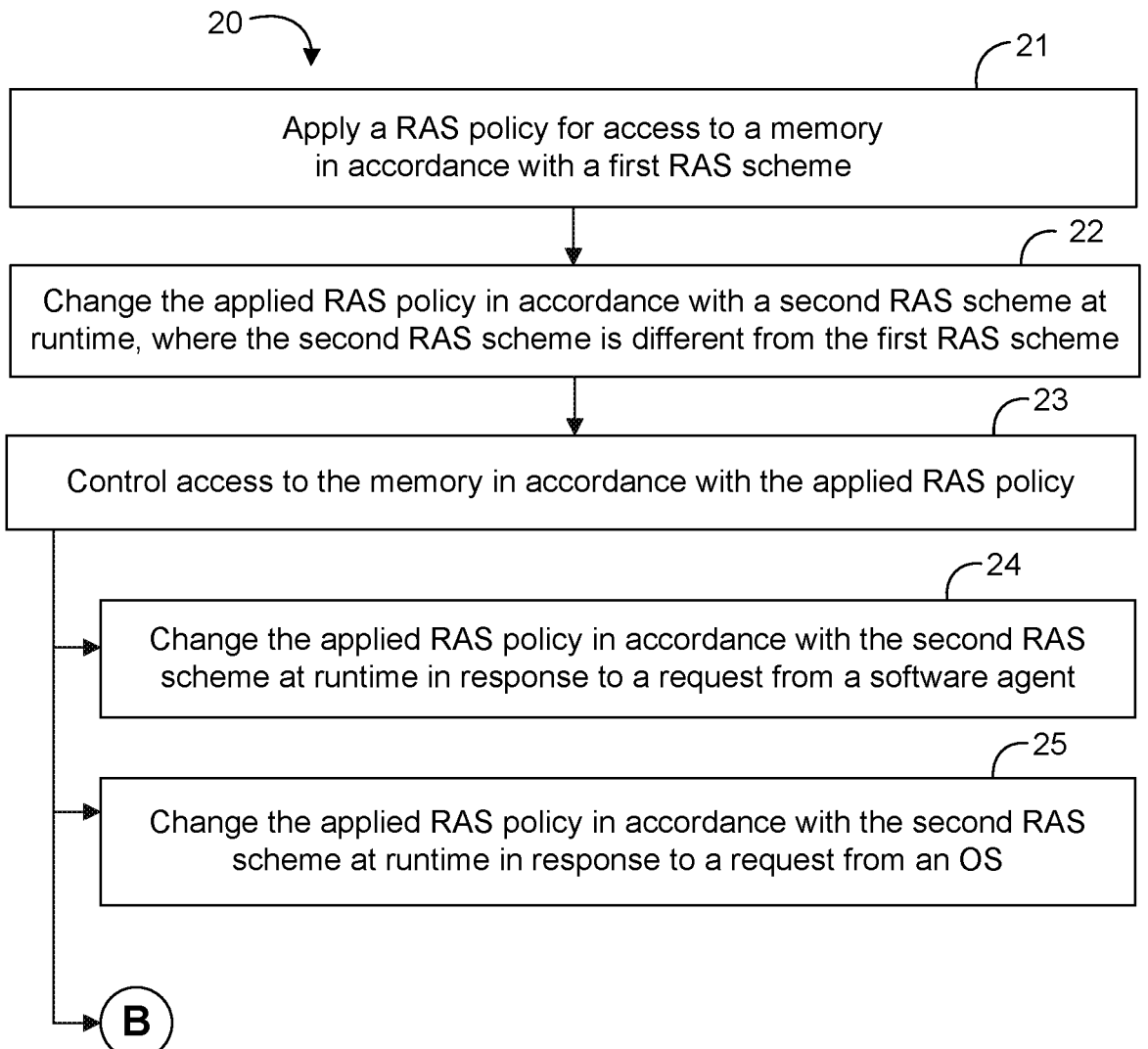

Turning now to FIGS. 3A to 3B, an embodiment of a method 20 may include applying a RAS policy for access to a memory in accordance with a first RAS scheme at block 21, changing the applied RAS policy in accordance with a second RAS scheme at runtime, where the second RAS scheme is different from the first RAS scheme at block 22, and controlling access to the memory in accordance with the applied RAS policy at block 23. For example, the method 20 may include changing the applied RAS policy in accordance with the second RAS scheme at runtime in response to a request from a software agent at block 24, and/or changing the applied RAS policy in accordance with the second RAS scheme at runtime in response to a request from an OS at block 25.

In some embodiments, the method 20 may further include tracking a suitability of the applied RAS policy at block 26, and maintaining correlative prediction information on a per memory region basis for a current RAS scheme of the applied RAS policy based on the tracked suitability at block 27. For example, the method 20 may also include tracking one or more operation conditions of the memory at block 28, and including memory operation condition information based on the tracked one or more operation conditions as part of the correlative prediction information at block 29. The method 20 may further include providing the correlative prediction information to a software agent at block 30. In some embodiments, the memory may be one of natively coupled to a processor and communicatively coupled to a processor via a cache-coherent interconnect at block 31.

Embodiments of the method 20 may be implemented in a system, apparatus, computer, device, etc., for example, such as those described herein. More particularly, hardware implementations may include configurable logic (e.g., suitably configured PLAs, FPGAs, CPLDs, general purpose microprocessors, etc.), fixed-functionality logic (e.g., suitably configured ASICs, combinational logic circuits, sequential logic circuits, etc.), or any combination thereof. Hybrid hardware implementations include static dynamic System-on-Chip (SoC) re-configurable devices such that control flow, and data paths implement logic for the functionality. Alternatively, or additionally, the method 20 may be implemented in one or more modules as a set of logic instructions stored in a machine- or computer-readable storage medium such as RAM, ROM, PROM, firmware, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages.

For example, the method 20 may be implemented on a computer readable medium. Embodiments or portions of the method 20 may be implemented in firmware, applications (e.g., through an application programming interface (API)), or driver software running on an OS. Additionally, logic instructions might include assembler instructions, instruction set architecture (ISA) instructions, data set architecture (DSA) commands, (machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, Moore Machine, Mealy Machine, etc.).

As more functionality, capability, and resources are packed into a platform (e.g., including higher thermal design power (TDP), more channels, larger DIMMs, memory hierarchy, etc.), the platform may benefit from more advanced RAS capabilities in order to handle errors that come up. CXL type 2 and type 3 devices may include local memory or may provide memory expansion boards and storage-class memory that may use the CXL.memory protocol. As such CXL device types become more utilized in the industry, DRAM errors may be more prevalent and improved RAS schemes may be needed.

An embodiment of a platform may utilize one or more memory RAS features including but not limited to partial mirroring, ADDDC, aggressive/adaptive ECC, refresh intervals for different regions, unmapping an address range, and migrating data. Many of these features may be proactively applied, for example, when there is an expectation for increased memory errors in some subset of the DIMMs or memory address space. This expectation of memory errors in itself may depend on various dynamic factors in the system. Non-limiting examples of dynamic factors include access interval, refresh interval, and data pattern. With respect to access interval, for example, less frequent accesses may correlate with fewer errors. With respect to refresh interval, for example, more frequent refreshes may correlate with fewer errors. With respect to data pattern, for example, errors may be affected by data stored in other cells (e.g., for some memory types a row stripe data pattern may exhibit substantially higher error rates as compared to a solid data pattern).

In addition to the foregoing parameters, other non-limiting examples of dynamic factors include temperature profiles of various DIMMs, surrounding air temperature, read-write mix, etc. Another predictive factor includes chip density. For example, higher chip density may correlate with a higher error rate.

As noted above, a statically applied RAS policy may not be optimal for the system as a whole. For example, there may be differences in spatial occurrence of errors, due to differences in temperature between DIMMs, differences in bandwidth/accesses, differences in existing data on the DIMMs, etc. There may also be differences in temporal occurrence of errors, due to differences in temperature between DIMMs, differences in bandwidth/accesses, differences in existing data on the DIMMs, etc. that may vary over time as an additional dimension.

In accordance with some embodiments, a RAS policy may be selected at runtime based on what RAS policy may be better for one set of circumstances versus another. For example, if there are hot (from temperature standpoint) memory DIMMs and cooler DIMMs, a RAS policy may be applied that utilizes mirroring to cooler DIMMs may work best. But if the temperature is more or less uniform across the DIMMs, another RAS policy that works better in that circumstance may be applied such as, for example, aggressive ECC for double device correction. Some embodiments may further consider implications on system performance for some usages, and may apply a RAS policy that may have less performance impact as compared to a currently applied RAS policy (e.g., and/or less performance impact as compared to other possible RAS policies).

Selection of a particular RAS feature to mitigate the impact of errors may be more or less successful as compared to other candidate RAS features. Some embodiments provide technology to build a correlative predictor that remembers the success/suitability of a given RAS policy in a certain memory region under certain set of existing conditions, and leverages that information to make more intelligent adaptive RAS policy selections. Some embodiments may be particularly beneficial for deployments where ambient conditions are highly dynamic and temperatures may change from normal to extreme conditions over the course of the day or year. For example, edge computing applications may involve numerous locations that may be exposed to challenging and dynamic conditions. Non-limiting examples of edge components/applications that may benefit from embodiments described herein include base stations, control delivery networks, small cells, on-premise equipment equipment or cloudlets, cell towers, and micro-datacenters.

Some embodiments provide technology to employ an adaptive memory RAS policy (e.g., instead of a static RAS policy) in native attach memory and CXL memory. Although SDE may still occur in the presence of double device errors, the likelihood of avoiding such an error may vary across different RAS schemes. In accordance with embodiments of adaptive RAS, schemes with higher likelihood of preventing SDE may be applied as needed based on system conditions, such as memory temperature and rates of detected single bit errors. Further, if conditions warrant, an embodiment of an adaptive memory RAS scheme may enforce double data device correction (DDDC) with mirroring and virtual-lock-step mode (VLS) to guarantee detection of double device errors and prevent SDE in this case. Because there may be a performance loss for this operating mode, some embodiments may only apply the noted adaptive memory RAS scheme when platform conditions (temperature and single bit error rates for example) indicate that the noted adaptive memory RAS scheme is necessary. Advantageously, some embodiments may handle memory errors with less time wasted correcting single bit errors or transient errors as a result of temperature on the platforms. In a datacenter scenario where servers are expected to run 24×7, some embodiment may advantageously improve server availability. In some embodiments, memory (e.g., local memory, remote memory, pooled memory, remote pooled memory, etc.) may be part of a composable server (e.g., a server that utilizes composable disaggregated infrastructure (CDI) with management software, sometimes referred to as an orchestrator or a composer, or otherwise makes use of high-bandwidth, low-latency interconnects to aggregate compute, storage, and networking fabric resources into shared resource pools that can be available for on-demand allocation) and/or an adaptive memory RAS scheme may be implemented at least in part by the orchestrator/composer.

Figure 4A:
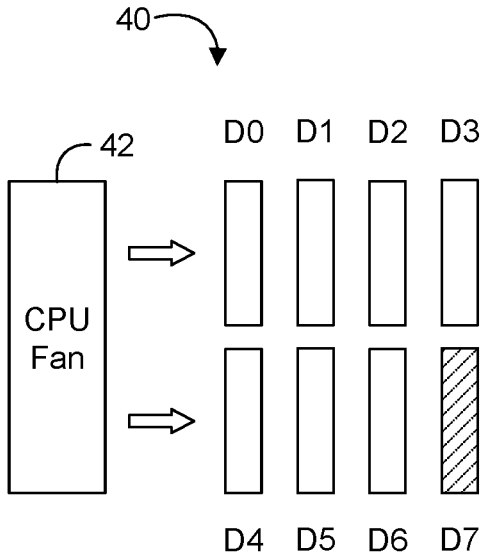
Figure 4B:
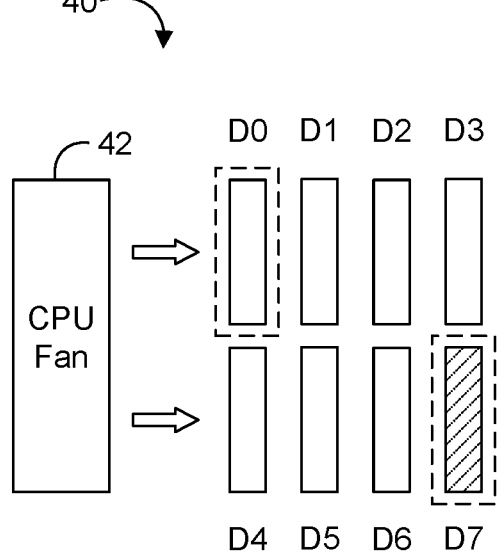

With reference to FIGS. 4A to 4E, an embodiment of a computing system 40 may include multiple DIMMs DO through D7 arranged to receive airflow from a CPU fan 42. The computing system 40 includes technology (e.g., logic, circuitry, programming, etc.) to build a correlative predictor that maintains information related to the success/suitability of a given RAS policy for the DIMMs DO through D7 under different sets of operating conditions, and leverages the maintained information to make more intelligent adaptive RAS policy selections (e.g., to correlate a change in operating conditions with predicted success/suitability of respective RAS policies). For example, if system conditions indicate a higher probability of double device error, the adaptive RAS policy may be changed during run time to guarantee detection of such double device errors. After the predictor identifies the high temperature memory region or the region with some correctable error (CE) events that is potentially in the high temperature zone (e.g., far away from CPU fan), some embodiments may pair the high temperature region with a low temperature region and change the ECC algorithm from SDDC to DDDC. FIG. 4A shows that D7 is identified as a memory region with potential for double device errors (e.g., a heated DIMM, or CE from D7 hits an assigned threshold). FIG. 4B shows that D7 is paired with DO (e.g., one of the low temperature DIMMS; a new RAS policy is applied to pair D7 with DO and change the ECC algorithm from SDDC to DDDC).

In this example newly applied RAS scheme, DDDC runs in virtual-lock-step (VLS) mode with an associated performance degradation. But the newly applied RAS scheme ensures error detection/correction of the failure from both high temperature and a failed memory device. In VLS mode, a memory read is performed by accessing two locations, the primary and the secondary, and the error detection/correction will be triggered when both half cacheline and ECC bits are read and combined. For the write operation, the ECC bits will be generated by the input single cacheline and the whole packet will be split into two parts and written to two regions.

FIG. 4C shows observation of the paired DDDC regions for the error correction/detection results. For the paired region, for example, the system 40 can overserve the error correction/detection results logged in the assigned registers. The system 40 can then decide to stay or move back to the regular SDDC scheme. FIG. 4D shows how the system 40 may decide to disconnect the pair and go back to the previously applied RAS scheme (e.g., if no errors are observed). FIG. 4E shows how the system 40 may decide to remained paired (e.g., if CE from single/double device failures are observed).

For the no error case, the system 40 may decide to continue take the precautions and execute the DDDC (e.g., based on the operating conditions). With the adaptive memory RAS capability, however, the system 40 may decide that the VLS region can be reversed back to the normal SDDC region if the temperature drops back to a normal range, advantageously improving system performance. For a logged single device error, the system 40 may decide that the paired region can continue. For a logged double device error, system 40 may decide to go to a service call to replace the DIMM or to stop the application.

FIG. 5 shows an embodiment of a data and ECC bits layout to support double device error correction. As illustrated in FIG. 5, a single cache line is split into two units. The first unit is columns 0 to 3 and columns 8 to 11. The second unit is columns 4 to 7 and columns 12 to 15. Each unit has 256b of data and 64b ECC. Some embodiments may use the standard Reed-Solomon (RS) code that operates in Galois Fields (GF) of $GF(2^{16})$, which is 16b per symbol, and forms a (20, 16) double symbol correction code. This RS ECC code layout has 16 data symbols and 4 ECC symbols.

In order to support double device error correction, the memory is accessed in VLS mode. The first half cache line is accessed from one rank and the second half cache line is read from another rank. For the above-noted RAS scheme, one rank is assigned from high temperature and another rank is assigned from low temperature. In VLS mode, if there are two device failures, up to 64b may be impacted and 128b ECC can guarantee to correct this type of failure. In order to further support double device error correction, no ECC bits are repurposed/borrowed to support other features (e.g., such as directory or security).

Figure 6:
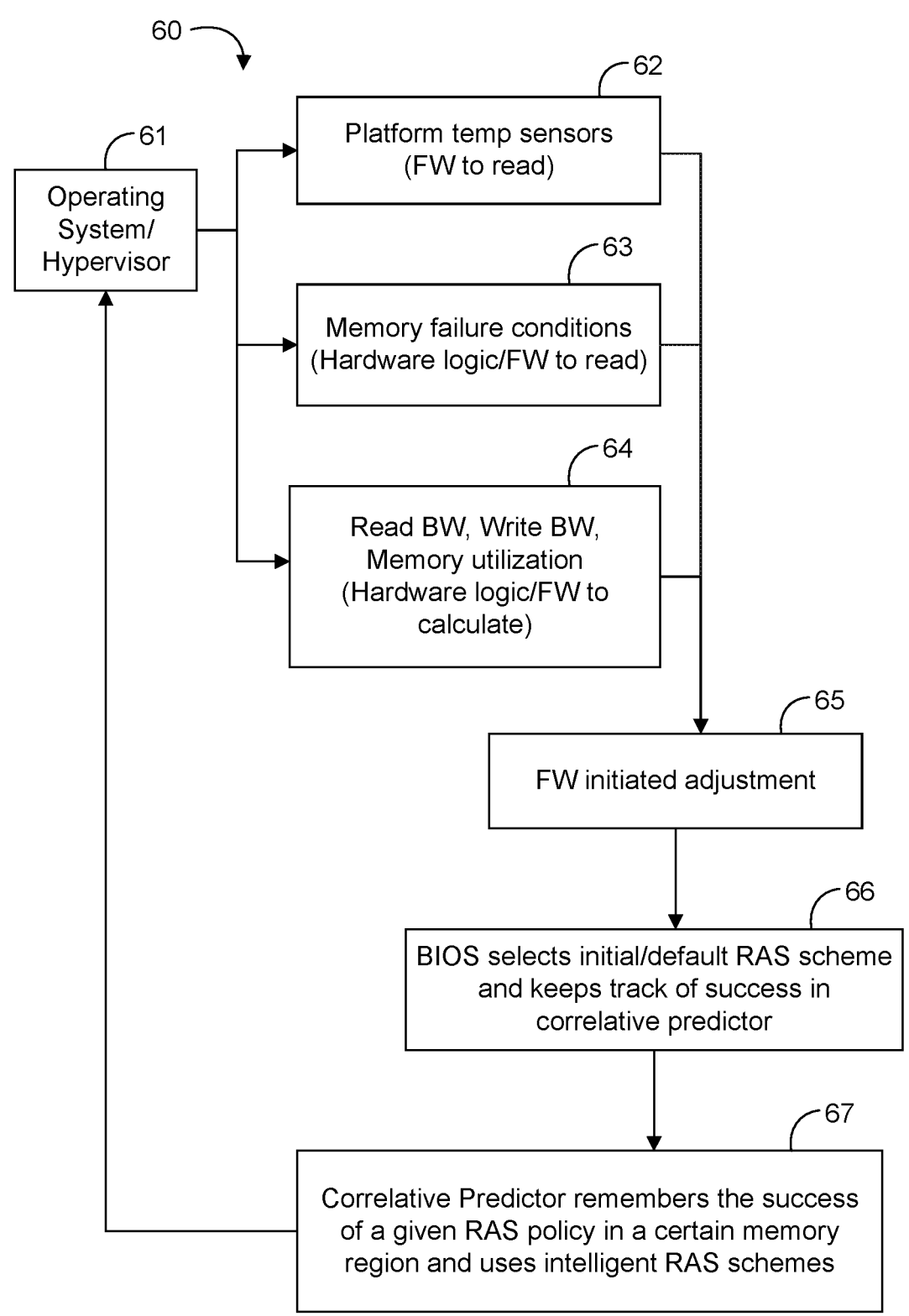
FIG. 6 is a flow chart of an example of a process flow according to an embodiment.

FIG. 6 shows an embodiment of a system level RAS flow 60. At box 61, the memory, thermal level, and other status details are exposed to an OS and/or hypervisor (e.g., and/or other software agent) for the OS/hypervisor to fetch the right set of pages where, based on the scenarios, the errors are less. The OS/hypervisor may request the firmware (FW) to look at platform temperature sensors (e.g., DIMM sensors) at box 62, different memory failure conditions (e.g., CE, UE, SUE, etc.) at box 63, and then important memory parameters such as read/write bandwidth (BW), frequently accessed memory regions, memory command utilization, etc. at box 64. At box 65, firmware initiated adjustments are made. At box 66, the BIOS selects an initial/default RAS scheme and keeps track of success in a correlative predictor. At box 67, the correlative predictor remembers the success of a given RAS policy in a certain memory region and uses intelligent RAS schemes. For example, based on the sensed/monitored operating conditions of the memory, firmware intelligently starts adjusting the RAS schemes based on the scenarios and track the details based on the correlative predictor results. After changes to the RAS policy are applied, the details are exposed to the OS for different memory regions with details and the current RAS policy. In some embodiments, a system may selectively enable and disable adaptive RAS memory policies. As the memory space is increasing with CXL, enabling this feature may advantageously helps the system to adjust and apply RAS schemes adaptively based on runtime situations.

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Figure 7:
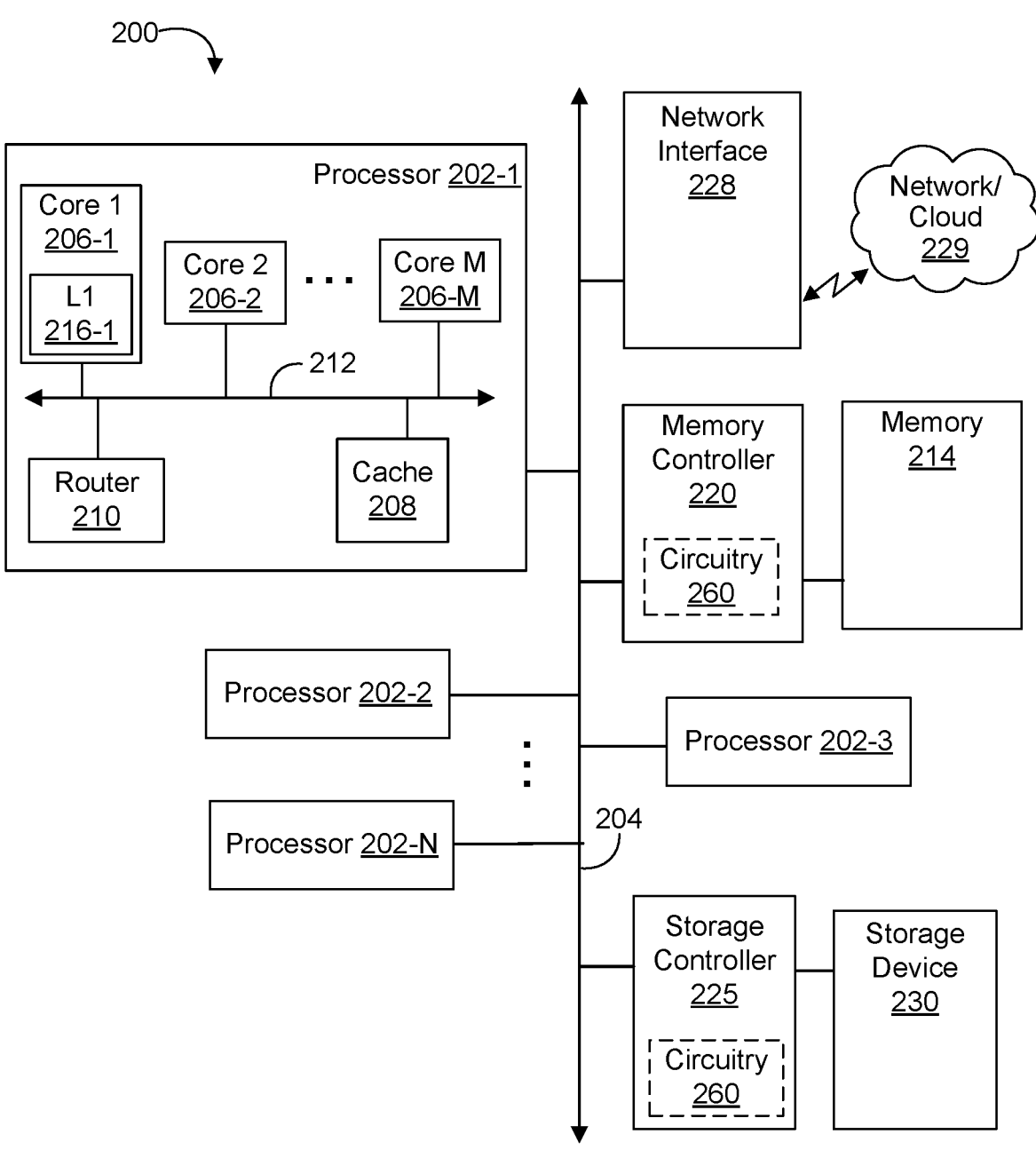
FIG. 7 is a block diagram of another example of a computing system according to an embodiment.

Turning now to FIG. 7, an embodiment of a computing system 200 may include one or more processors 202-1 through 202-N (generally referred to herein as "processors 202" or "processor 202"). The processors 202 may communicate via an interconnection or bus 204. Each processor 202 may include various components some of which are only discussed with reference to processor 202-1 for clarity. Accordingly, each of the remaining processors 202-2 through 202-N may include the same or similar components discussed with reference to the processor 202-1.

In some embodiments, the processor 202-1 may include one or more processor cores 206-1 through 206-M (referred to herein as "cores 206," or more generally as "core 206"), a cache 208 (which may be a shared cache or a private cache in various embodiments), and/or a router 210. The processor cores 206 may be implemented on a single integrated circuit (IC) chip. Moreover, the chip may include one or more shared and/or private caches (such as cache 208), buses or interconnections (such as a bus or interconnection 212), memory controllers, or other components.

In some embodiments, the router 210 may be used to communicate between various components of the processor 202-1 and/or system 200. Moreover, the processor 202-1 may include more than one router 210. Furthermore, the multitude of routers 210 may be in communication to enable data routing between various components inside or outside of the processor 202-1.

The cache 208 may store data (e.g., including instructions) that is utilized by one or more components of the processor 202-1, such as the cores 206. For example, the cache 208 may locally cache data stored in a memory 214 for faster access by the components of the processor 202. As shown in FIG. 7, the memory 214 may be in communication with the processors 202 via the interconnection 204. In some embodiments, the cache 208 (that may be shared) may have various levels, for example, the cache 208 may be a mid-level cache and/or a last-level cache (LLC). Also, each of the cores 206 may include a level 1 (L1) cache (216-1) (generally referred to herein as "L1 cache 216"). Various components of the processor 202-1 may communicate with the cache 208 directly, through a bus (e.g., the bus 212), and/or a memory controller or hub.

As shown in FIG. 7, memory 214 may be coupled to other components of system 200 through a memory controller 220. Memory 214 may include volatile memory and may be interchangeably referred to as main memory or system memory. Even though the memory controller 220 is shown to be coupled between the interconnection 204 and the memory 214, the memory controller 220 may be located elsewhere in system 200. For example, memory controller 220 or portions of it may be provided within one of the processors 202 in some embodiments. Alternatively, memory 214 may include byte-addressable non-volatile memory such as INTEL OPTANE technology.

The system 200 may communicate with other devices/systems/networks via a network interface 228 (e.g., which is in communication with a computer network and/or the cloud 229 via a wired or wireless interface). For example, the network interface 228 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 229.

System 200 may also include a storage device such as a storage device 230 coupled to the interconnect 204 via storage controller 225. Hence, storage controller 225 may control access by various components of system 200 to the storage device 230. Furthermore, even though storage controller 225 is shown to be directly coupled to the interconnection 204 in FIG. 7, storage controller 225 can alternatively communicate via a storage bus/interconnect (such as the SATA (Serial Advanced Technology Attachment) bus, Peripheral Component Interconnect (PCI) (or PCI EXPRESS (PCIe) interface), NVM EXPRESS (NVMe), Serial Attached SCSI (SAS), Fiber Channel, CXL, etc.) with one or more other components of system 200 (for example where the storage bus is coupled to interconnect 204 via some other logic like a bus bridge, chipset, etc.) Additionally, storage controller 225 may be incorporated into memory controller logic or provided on a same integrated circuit (IC) device in various embodiments (e.g., on the same circuit board device as the storage device 230 or in the same enclosure as the storage device 230).

Furthermore, storage controller 225 and/or storage device 230 may be coupled to one or more sensors (not shown) to receive information (e.g., in the form of one or more bits or signals) to indicate the status of or values detected by the one or more sensors. These sensor(s) may be provided proximate to components of system 200 (or other computing systems discussed herein), including the cores 206, interconnections 204 or 212, components outside of the processor 202, storage device 230, SSD bus, SATA bus, storage controller 225, circuitry 260, etc., to sense variations in various factors affecting power/thermal behavior of the system/platform, such as temperature, operating frequency, operating voltage, power consumption, and/or inter-core communication activity, etc.

As shown in FIG. 7, features or aspects of the circuitry 260 may be distributed throughout the system 200, and/or co-located/integrated with various components of the system 200. Any aspect of the system 200 that may require or benefit from provide adaptive memory RAS policy technology and/or correlative prediction technology may include the circuitry 260. For example, the memory controller 220 and the storage controller 225 may each include circuitry 260, which may be in the same enclosure as the system 200 and/or fully integrated on a printed circuit board (PCB) of the system 200. For example, the circuitry 260 may be configured to implement the adaptive memory RAS policy and/or correlative prediction features of the various embodiments. For example, the respective circuitry 260 may be configured to provide adaptive memory RAS policy technology and/or correlative prediction technology for the memory 214 and/or the storage device 230. The processors 202 may implement the host/OS/agent aspects of the various embodiments described herein.

Advantageously, the circuitry 260 may include technology to implement one or more aspects of the system 10 (FIG. 1), the apparatus 15 (FIG. 2), the method 20 (FIGS. 3A to 3B), the system 40 (FIGS. 4A to 4E), the flow 60 (FIG. 6), and/or any of the adaptive memory RAS policy and/or correlative prediction features discussed herein. The system 200 may include further circuitry 260 and located outside of the foregoing components.

In some embodiments, the circuitry 260 may be configured to apply a RAS policy for access to the memory 214 in accordance with a first RAS scheme (e.g., at boot time), change the applied RAS policy in accordance with a second RAS scheme at runtime (where the second RAS scheme is different from the first RAS scheme), and access the memory 214 in accordance with the applied RAS policy. In some embodiments, the circuitry 260 may be configured to change the applied RAS policy in accordance with the second RAS scheme at runtime in response to a request from a software agent (e.g., an operating system (OS), a hypervisor, etc.).

In some embodiments, the circuitry 260 may be further configured to track a success/suitability of the applied RAS policy, and maintain correlative prediction information on a per memory region basis for a current RAS scheme of the applied RAS policy based on the tracked success/suitability. The circuitry 260 may also be configured to track one or more operation conditions of the memory 214, and include memory operation condition information based on the tracked one or more operation conditions as part of the correlative prediction information. For example, the circuitry 260 may be further configured to provide the correlative prediction information to a software agent (e.g., an OS, a hypervisor, etc.). For example, the processors 202 may be natively coupled to the memory 214, communicatively coupled to the memory 214 via a cache-coherent interconnect (e.g., such as Compute Express Link (CXL)), etc. For example, the memory controller 220 and memory 214 may be located on a CXL-based memory DIMM and the interconnection 204 may include a CXL interconnect link that provides an interface between the processors 202 and the CXL-based memory DIMM (e.g., through CXL.memory).

Figure 8:
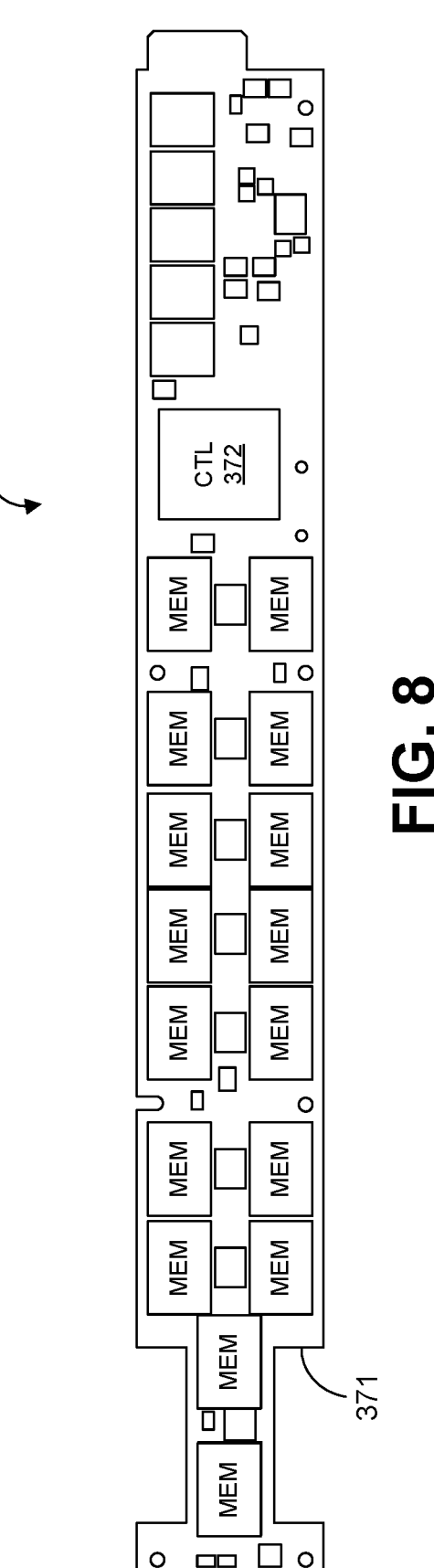
FIG. 8 is an illustrative top view of an example of a memory device according to an embodiment.

With reference to FIG. 8, an embodiment of a memory device 300 includes a PCB 371 with an E1.L standard form factor. The memory device 300 may be configured for performance clustered, bandwidth-optimized storage. FIG. 8 shows only one side of the memory device 300, with an example of 16 packages of memory ICs per side for a total of 32 memory ICs. In other examples, the number of packages/ICs may vary based on the configuration. The memory device 300 further includes a controller 372 with embodiments of technology for adaptive memory RAS policies as described herein. The controller 372 may be configured to provide adaptive memory RAS policies and/or correlative prediction features as described herein.

With reference to FIGS. 9A and 9B, an embodiment of a memory device 400 may include a PCB 481 with a DIMM form factor, including pins along both sides of a connector edge and components on both sides 481A and 481B of the DIMM. The number of pins shown in FIGS. 9A and 9B is for illustration purposes only, and more or fewer pins may be provided in various embodiments. The particular DIMM form factor shown in FIGS. 9A and 9B is for illustration purposes only, and other DIMM form factors may be provided in various embodiments. The memory device 400 may include additional components, circuitry, and logic to operate as a CXL standards compliant type 2 or type 3 device. For example, the memory device 400 may include, among other things, a controller 482 mounted on the PCB 481, interface component(s) including a communication interface, and a plurality of memory ICs mounted on the PCB 481. In accordance with some embodiments, the controller 482 includes technology for adaptive memory RAS policies as described herein. The controller 482 may be configured to provide adaptive memory RAS policies and/or correlative prediction features as described herein.

ADDITIONAL NOTES AND EXAMPLES

Example 1 includes an electronic apparatus, comprising one or more substrates, and a controller coupled to the one or more substrates, the controller including circuitry to apply a reliability, availability, and serviceability (RAS) policy for access to a memory in accordance with a first RAS scheme, change the applied RAS policy in accordance with a second RAS scheme at runtime, wherein the second RAS scheme is different from the first RAS scheme, and access the memory in accordance with the applied RAS policy.

Example 2 includes the apparatus of Example 1, wherein the circuitry is further to change the applied RAS policy in accordance with the second RAS scheme at runtime in response to a request from a software agent.

Example 3 includes the apparatus of any of Examples 1 to 2, wherein the circuitry is further to change the applied RAS policy in accordance with the second RAS scheme at runtime in response to a request from an operating system.

Example 4 includes the apparatus of any of Examples 1 to 3, wherein the circuitry is further to track a suitability of the applied RAS policy, and maintain correlative prediction information on a per memory region basis for a current RAS scheme of the applied RAS policy based on the tracked suitability.

Example 5 includes the apparatus of Example 4, wherein the circuitry is further to track one or more operation conditions of the memory, and include memory operation condition information based on the tracked one or more operation conditions as part of the correlative prediction information.

Example 6 includes the apparatus of any of Examples 4 to 5, wherein the circuitry is further to provide the correlative prediction information to a software agent.

Example 7 includes the apparatus of any of Examples 1 to 6, wherein the memory is one of natively coupled to a processor and communicatively coupled to a processor via a cache-coherent interconnect.

Example 8 includes an electronic system, comprising memory, and a controller communicatively coupled to the memory, the controller including circuitry to apply a reliability, availability, and serviceability (RAS) policy for access to the memory in accordance with a first RAS scheme, change the applied RAS policy in accordance with a second RAS scheme at runtime, wherein the second RAS scheme is different from the first RAS scheme, and access the memory in accordance with the applied RAS policy.

Example 9 includes the system of Example 8, wherein the circuitry is further to change the applied RAS policy in accordance with the second RAS scheme at runtime in response to a request from a software agent.

Example 10 includes the system of any of Examples 8 to 9, wherein the circuitry is further to change the applied RAS policy in accordance with the second RAS scheme at runtime in response to a request from an operating system.

Example 11 includes the system of any of Examples 8 to 10, wherein the circuitry is further to track a suitability of the applied RAS policy, and maintain correlative prediction information on a per memory region basis for a current RAS scheme of the applied RAS policy based on the tracked suitability.

Example 12 includes the system of Example 11, wherein the circuitry is further to track one or more operation conditions of the memory, and include memory operation condition information based on the tracked one or more operation conditions as part of the correlative prediction information.

Example 13 includes the system of any of Examples 11 to 12, wherein the circuitry is further to provide the correlative prediction information to a software agent.

Example 14 includes the system of any of Examples 8 to 13, further comprising a processor natively coupled to the memory.

Example 15 includes the system of any of Examples 8 to 13, further comprising a processor communicatively coupled to the memory via a cache-coherent interconnect.

Example 16 includes a method, comprising applying a reliability, availability, and serviceability (RAS) policy for access to a memory in accordance with a first RAS scheme, changing the applied RAS policy in accordance with a second RAS scheme at runtime, wherein the second RAS scheme is different from the first RAS scheme, and controlling access to the memory in accordance with the applied RAS policy.

Example 17 includes the method of Example 16, further comprising changing the applied RAS policy in accordance with the second RAS scheme at runtime in response to a request from a software agent.

Example 18 includes the method of any of Examples 16 to 17, further comprising changing the applied RAS policy in accordance with the second RAS scheme at runtime in response to a request from an operating system.

Example 19 includes the method of any of Examples 16 to 18, further comprising tracking a suitability of the applied RAS policy, and maintaining correlative prediction information on a per memory region basis for a current RAS scheme of the applied RAS policy based on the tracked suitability.

Example 20 includes the method of Example 19, further comprising tracking one or more operation conditions of the memory, and including memory operation condition information based on the tracked one or more operation conditions as part of the correlative prediction information.

Example 21 includes the method of any of Examples 19 to 20, further comprising providing the correlative prediction information to a software agent.

Example 22 includes the method of any of Examples 16 to 21, wherein the memory is one of natively coupled to a processor and communicatively coupled to a processor via a cache-coherent interconnect.

Example 23 includes at least one non-transitory one machine readable medium comprising a plurality of instructions that, in response to being executed on a computing device, cause the computing device to apply a reliability, availability, and serviceability (RAS) policy for access to a memory in accordance with a first RAS scheme, change the applied RAS policy in accordance with a second RAS scheme at runtime, wherein the second RAS scheme is different from the first RAS scheme, and control access to the memory in accordance with the applied RAS policy.

Example 24 includes the at least one non-transitory one machine readable medium of Example 23, comprising a plurality of further instructions that, in response to being executed on the computing device, cause the computing device to change the applied RAS policy in accordance with the second RAS scheme at runtime in response to a request from a software agent.

Example 25 includes the at least one non-transitory one machine readable medium of Example 23 to 24, comprising a plurality of further instructions that, in response to being executed on the computing device, cause the computing device to changing the applied RAS policy in accordance with the second RAS scheme at runtime in response to a request from an operating system.

Example 26 includes the at least one non-transitory one machine readable medium of Example 23 to 25, comprising a plurality of further instructions that, in response to being executed on the computing device, cause the computing device to tracking a suitability of the applied RAS policy, and maintaining correlative prediction information on a per memory region basis for a current RAS scheme of the applied RAS policy based on the tracked suitability.

Example 27 includes the at least one non-transitory one machine readable medium of Example 26, comprising a plurality of further instructions that, in response to being executed on the computing device, cause the computing device to tracking one or more operation conditions of the memory, and including memory operation condition information based on the tracked one or more operation conditions as part of the correlative prediction information.

Example 28 includes the at least one non-transitory one machine readable medium of Example 26 to 27, comprising a plurality of further instructions that, in response to being executed on the computing device, cause the computing device to providing the correlative prediction information to a software agent.

Example 29 includes the at least one non-transitory one machine readable medium of any of Examples 23 to 28, wherein the memory is one of natively coupled to a processor and communicatively coupled to a processor via a cache-coherent interconnect.

Example 30 includes an apparatus, comprising means for applying a reliability, availability, and serviceability (RAS) policy for access to a memory in accordance with a first RAS scheme, means for changing the applied RAS policy in accordance with a second RAS scheme at runtime, wherein the second RAS scheme is different from the first RAS scheme, and means for controlling access to the memory in accordance with the applied RAS policy.

Example 31 includes the apparatus of Example 30, further comprising means for changing the applied RAS policy in accordance with the second RAS scheme at runtime in response to a request from a software agent.

Example 32 includes the apparatus of any of Examples 30 to 31, further comprising means for changing the applied RAS policy in accordance with the second RAS scheme at runtime in response to a request from an operating system.

Example 33 includes the apparatus of any of Examples 30 to 32, further comprising means for tracking a suitability of the applied RAS policy, and means for maintaining correlative prediction information on a per memory region basis for a current RAS scheme of the applied RAS policy based on the tracked suitability.

Example 34 includes the apparatus of Example 33, further comprising means for tracking one or more operation conditions of the memory, and means for including memory operation condition information based on the tracked one or more operation conditions as part of the correlative prediction information.

Example 35 includes the apparatus of any of Examples 33 to 34, further comprising means for providing the correlative prediction information to a software agent.

Example 36 includes the apparatus of any of Examples 30 to 35, wherein the memory is one of natively coupled to a processor and communicatively coupled to a processor via a cache-coherent interconnect.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An electronic apparatus, comprising:
one or more substrates; and
a controller coupled to the one or more substrates, the controller including circuitry to:
apply a reliability, availability, and serviceability (RAS) policy for access to a memory in accordance with a first RAS scheme; and
during a runtime:
track a first success of the RAS policy while the RAS policy is applied in accordance with the first RAS scheme;
generate first correlative prediction information based on the first success, wherein the first correlative prediction information is to indicate a first likelihood of an avoidance of an error with the first RAS scheme;
perform a selection of a second RAS scheme over the first RAS scheme, the selection based on each of the first correlative prediction information and second correlative prediction information which is to indicate a second likelihood of an avoidance of the error with the second RAS scheme, wherein the second correlative prediction information is to be generated during the runtime based on a second success of a RAS policy while the RAS policy is applied in accordance with the second RAS scheme, wherein the circuitry to perform the selection comprises the circuitry to detect that the second likelihood is greater than the first likelihood, wherein the second RAS scheme is different from the first RAS scheme; and
apply the RAS policy for access to the memory in accordance with the second RAS scheme based on the selection.

2. The apparatus of claim 1, wherein the circuitry is to perform the selection in response to a request from a software agent.

3. The apparatus of claim 1, wherein the circuitry is to perform the selection in response to a request from an operating system.

4. The apparatus of claim 1, wherein the circuitry is to maintain correlative prediction information on a per memory region basis.

5. The apparatus of claim 4, wherein:
the circuitry is further to track one or more operation conditions of the memory; and
the circuitry is to generate the first correlative prediction information further based on the tracked one or more operation conditions.

6. The apparatus of claim 4, wherein the circuitry is further to:
provide the first correlative prediction information to a software agent.

7. The apparatus of claim 1, wherein the memory is one of:
natively coupled to a processor; or
communicatively coupled to the processor via a cache-coherent interconnect.

8. An electronic system, comprising:
memory; and
a controller communicatively coupled to the memory, the controller including circuitry to:
apply a reliability, availability, and serviceability (RAS) policy for access to the memory in accordance with a first RAS scheme; and
during a runtime:
track a first success of the RAS policy while the RAS policy is applied in accordance with the first RAS scheme;
generate first correlative prediction information based on the first success, wherein the first correlative prediction information is to indicate a first likelihood of an avoidance of an error with the first RAS scheme;
perform a selection of a second RAS scheme over the first RAS scheme, the selection based on each of the first correlative prediction information and second correlative prediction information which is to indicate a second likelihood of an avoidance of the error with the second RAS scheme, wherein the second correlative prediction information is to be generated during the runtime based on a second success of a RAS policy while the RAS policy is applied in accordance with the second RAS scheme, wherein the circuitry to perform the selection comprises the circuitry to detect that the second likelihood is greater than the first likelihood, wherein the second RAS scheme is different from the first RAS scheme; and
apply the RAS policy for access to the memory in accordance with the second RAS scheme based on the selection.

9. The system of claim 8, wherein the circuitry is to perform the selection in response to a request from a software agent.

10. The system of claim 8, wherein the circuitry is to perform the selection in response to a request from an operating system.

11. The system of claim 8, wherein the circuitry is to maintain correlative prediction information on a per memory region basis.

12. The system of claim 11, wherein:
the circuitry is further to track one or more operation conditions of the memory; and
the circuitry is to generate the first correlative prediction information further based on the tracked one or more operation conditions.

13. The system of claim 11, wherein the circuitry is further to:
provide the first correlative prediction information to a software agent.

14. The system of claim 8, further comprising:
a processor natively coupled to the memory.

15. The system of claim 8, further comprising:
a processor communicatively coupled to the memory via a cache-coherent interconnect.

16. A method, comprising:
applying a reliability, availability, and serviceability (RAS) policy for access to a memory in accordance with a first RAS scheme; and
during a runtime:
tracking a first success of the RAS policy while the RAS policy is applied in accordance with the first RAS scheme;
generating first correlative prediction information based on the first success, wherein the first correlative prediction information indicates a first likelihood of an avoidance of an error with the first RAS scheme;

performing a selection of a second RAS scheme over the first RAS scheme, the selection based on each of the first correlative prediction information and second correlative prediction information which indicates a second likelihood of an avoidance of the error with the second RAS scheme, wherein the second correlative prediction information is generated during the runtime based on a second success of a RAS policy while the RAS policy is applied in accordance with the second RAS scheme, wherein performing the selection comprises detecting that the second likelihood is greater than the first likelihood, wherein the second RAS scheme is different from the first RAS scheme; and applying the RAS policy for access to the memory in accordance with the second RAS scheme based on the selection.

17. The method of claim 16, wherein the selection is performed in response to a request from a software agent.

18. The method of claim 16, wherein the selection is performed in response to a request from an operating system.

19. The method of claim 16, wherein generating the first correlative prediction information comprises maintaining correlative prediction information on a per memory region basis.

20. The method of claim 19, further comprising tracking one or more operation conditions of the memory, wherein the first correlative prediction information is generated further based on the tracked one or more operation conditions.

21. The method of claim 19, further comprising:

providing the first correlative prediction information to a software agent.

22. The method of claim 16, wherein the memory is one of:

natively coupled to a processor; or communicatively coupled to the processor via a cache-coherent interconnect.

* * * * *